(12) United States Patent
Robbins, III et al.

(10) Patent No.: US 6,177,165 B1
(45) Date of Patent: Jan. 23, 2001

(54) DESK CHAIRMAT WITH HANDLES AND RELATED PROCESS

(75) Inventors: Edward S. Robbins, III, 2802 E. Avalon Ave., Muscle Shoals, AL (US) 35661; John Robbins, Killen, AL (US); John D. Carlton, Florence, AL (US); Gary L. House, Rogersville, AL (US)

(73) Assignee: Edward S. Robbins, III, Muscle Shoals, AL (US)

(*) Notice: Under 35 U.S.C. 154(b), the term of this patent shall be extended for 0 days.

(21) Appl. No.: 09/097,586

(22) Filed: Jun. 16, 1998

(51) Int. Cl.[7] .................. B32B 1/04; B32B 3/06
(52) U.S. Cl. .................. 428/43; 428/120; 428/99; 428/80; 428/192; 248/346.01
(58) Field of Search .................. 428/99, 192, 80, 428/81, 120, 43; 383/4; 248/346.01; 5/417

(56) References Cited

U.S. PATENT DOCUMENTS

| | | |
|---|---|---|
| 3,323,151 | 6/1967 | Lerman . |
| 4,370,767 | 2/1983 | Fraser . |
| 4,574,101 | 3/1986 | Tricca et al. . |
| 4,784,888 | 11/1988 | Schwertner et al. . |
| 4,926,512 * | 5/1990 | Coyle ........................... 5/417 |
| 4,940,620 | 7/1990 | Silk et al. . |
| 5,073,428 | 12/1991 | Lancelot et al. . |
| 5,439,405 | 8/1995 | Storey et al. . |
| 5,577,730 * | 11/1996 | Vannozzi ........................ 273/260 |
| 5,916,658 * | 6/1999 | Mohr ............................. 428/81 |

\* cited by examiner

Primary Examiner—Alexander S. Thomas
(74) Attorney, Agent, or Firm—Nixon & Vanderhye P.C.

(57) ABSTRACT

A desk chairmat includes a semi-rigid and substantially planar member of solid plastic material, the chairmat having four side edges with a lip portion extending from one of the side edges, an upper side of the chairmat having a substantially smooth upper surface. At least a first handle attached to or formed integrally with the chairmat along one of the side edges of the chairmat.

19 Claims, 10 Drawing Sheets

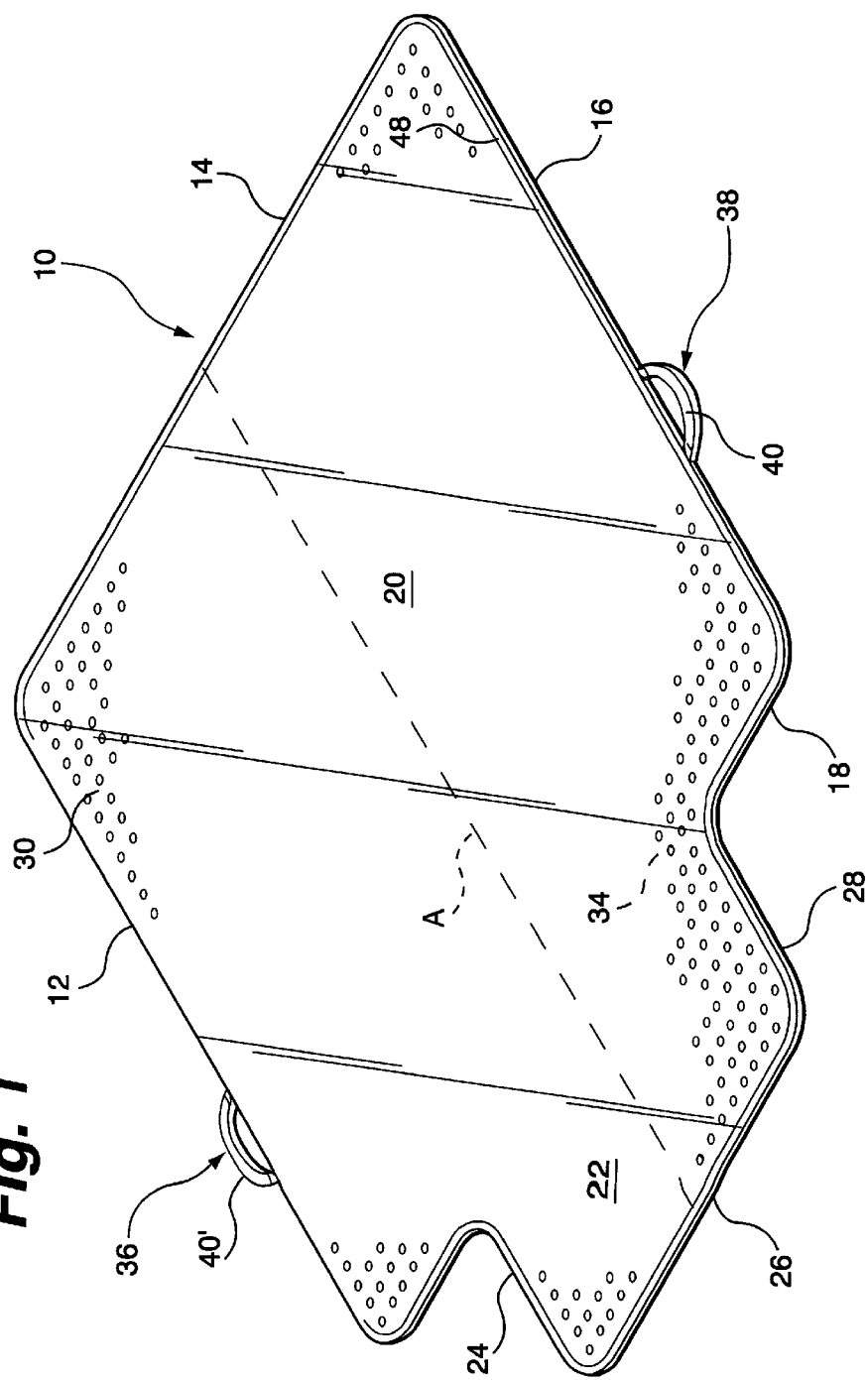
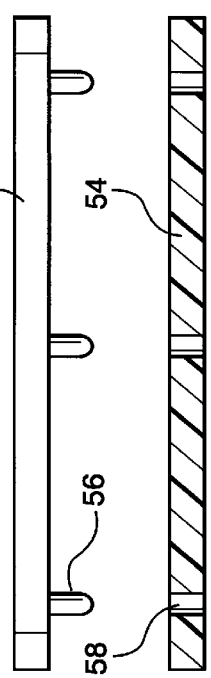
Fig. 1
Fig. 3

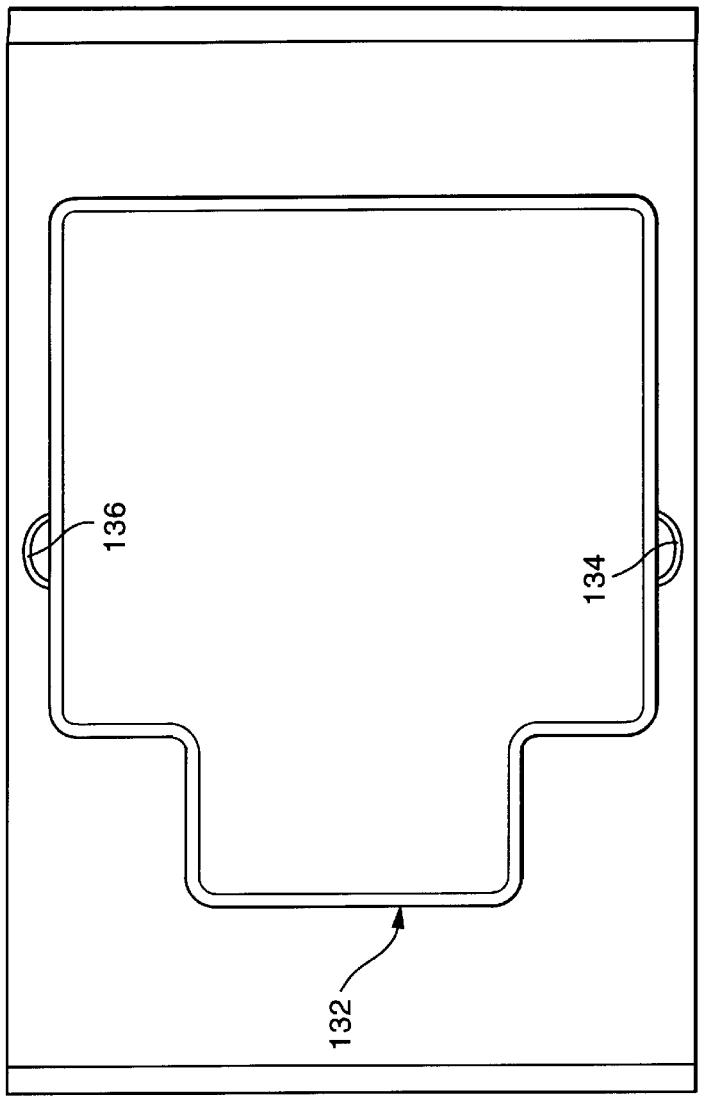
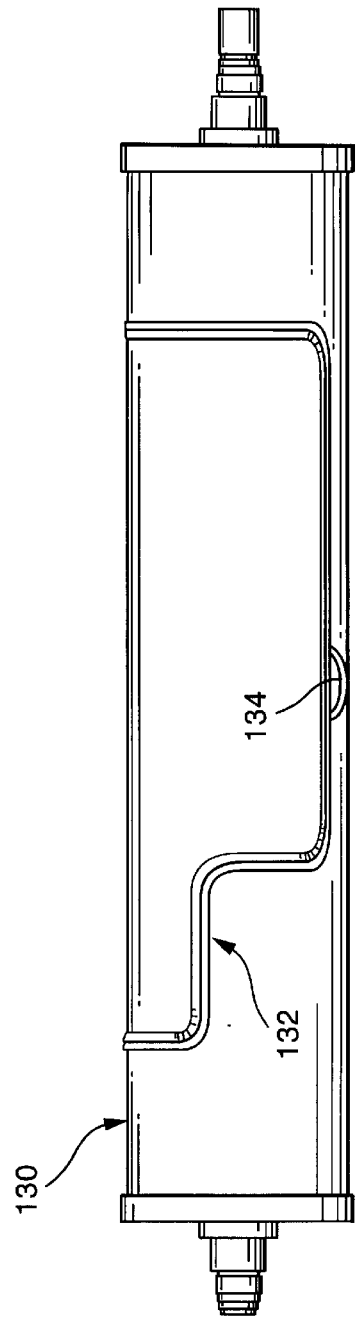

DESK CHAIRMAT WITH HANDLES AND RELATED PROCESS

TECHNICAL FIELD

This invention relates to chairmats and specifically, to chairmats typically used under desk chairs in order to protect the underlying carpet or hard flooring, and to a process for forming such chairmats.

BACKGROUND

Desk chairmats for office and home use are well known. Chairmats of this type typically have a main portion on which the desk chair rolls, and a forward lip portion which is adapted to extend partially under the desk well, and on which the feet of the person sitting in the chair rest. Desk chairmats which are to be applied over carpeting typically have short but relatively sharp spikes designed to hold the chairmat firmly in place.

The above described desk chairmats, and particularly those with spikes projecting from the underside thereof, are difficult to carry and/or otherwise handle due to their relatively large size and the semi-rigid nature of the material from which they are formed. Unless the chairmat is boxed or otherwise protected, the user typically carries the chairmat by gripping about one or two of the edges of the chairmat, often resulting in irritation if not injury to the hands due to the spikes projecting from the underside of the chairmat.

Some attempts have been made to solve the problem, but only to the extent of making the chairmats foldable to thereby reduce their size for handling purposes. See, for example, U.S. Pat. No. 5,073,428 and commonly owned U.S. Pat. No. 4,784,888. Fold lines across the major portion of the chairmat are not always desirable however, since they may be considered unsightly, possibly weaken the chairmat, and often affect the rolling action of the chair casters.

For the most part, desk chairmats have been sold at office supply stores or distributors as opposed to retail stores, so that to some extent, the handling problem was alleviated by boxing the chairmats individually or in groups prior to shipping. However, even when supplied from a distributor in boxed form, the end user has to remove the chairmat from the box and carry it to its final destination, again, with some difficulty due to the physical attributes of the chairmat. In any event, chairmats are now being found increasingly in retail outlets, compounding the problem and, while it is recognized that the chairmats may be boxed, the fact is that boxes add cost and remain unwieldy, and are therefore not likely to be used in the retail environment.

Accordingly, there remains a need for a solution to the problem of transporting desk chairmats easily and safely, particularly those chairmats which have carpet spikes.

SUMMARY OF THE INVENTION

This invention relates to the use of handles with desk chairmats. One impediment to simply putting handles on a desk chairmat, however, is that the handles themselves may interfere with the desired free rolling of the chair casters on the chairmat. For example, if handles were to be applied to the chairmat, one can imagine the desk chair rollers or casters or shoe heels becoming caught within a handle opening.

In accordance with this invention, various embodiments of desk chairmats with handles are disclosed which solve the handling problem and which, because of other novel design features, do not in any way impede the rolling action of chair casters on the chairmat.

In a first exemplary embodiment, integral handles are molded in place on opposite sides of the chairmat. With this arrangement, the chairmat may be pulled together (by a partial rolling or folding of the chairmat with the carpet spikes facing inwardly) at these opposite sides so that the two handles align, thereby not only reducing the profile of the chairmat, but also forming a single stronger handle enabling the user to carry the chairmat without difficulty. In this exemplary embodiment, the handles are connected to the respective chairmat edges by thinned webs which enable the handles to be torn away (or cut) from the chairmat once the chairmat is in its final location. In order to further enhance the tear-away capability, one or more notches (or perforations) may be formed within the thinned web areas to initiate and facilitate the tearing action. In a variation of this embodiment, the handle can be folded under the mat and held in place in a recess or flush against the underside of the mat. Friction fit or snap fit arrangements are contemplated as optional features. Since the handles have a thickness less than the length of the carpet spikes (and preferably less than the chairmat), there are no unsightly bulges in the otherwise planar mat.

Another variation of this embodiment of the invention relates to the provision for complementary surface engagement means on portions of the opposed handles so that when the chairmat sides are brought together with the handles in alignment, the handles may be releasably locked together. Such mating surface configurations can include prongs on one handle portion and holes on the other handle portion, or may include a solid bar on one handle portion adapted to fit within a complementary groove provided in the other handle portion.

In an alternative but related embodiment, one of the handles may be made larger in width than the other so that the smaller width handle may be pulled through the opening in the larger width handle (but with a larger loop) and releasably held in place, with the user grasping only the smaller width handle with the larger loop.

In still another embodiment, removable handles are supplied, utilizing an appropriate non-permanent adhesive, which holds the handle or handles to the chairmat during normal lifting operations, but which also permits the handle (s) to be peeled away from the chairmat when no longer needed.

In still another exemplary embodiment, handle panels within the periphery of the chairmat are each die cut about three sides and integrally hinged along the remaining fourth side, thereby allowing the panel to be hinged out of the plane of the chairmat, creating a handle opening. When the handles are no longer needed, the panels can be pushed back into the plane of the chairmat, thereby leaving a smooth surface which does not interfere to any significant extent with the rolling of the desk chair casters on the chairmat.

In still another exemplary embodiment, a pair of small holes are formed in one side, or in two opposite sides, of the chairmat, allowing the attachment of string handles which can be easily removed when no longer needed.

The invention also relates to a process for forming chairmats as described herein, utilizing pattern rolls substantially as described in commonly owned U.S. Pat. No. 5,213,741. The process described therein is modified, of course, to form chairmats having integral and/or separable handles as described herein. The method includes the step of providing a pattern roll fabricated from a cylindrical base roll which includes a continuous pattern rib extending about a portion of the roll's cylindrical surface so as to establish both the interior region of the chairmat as well as the integral handles. The continuous pattern rib is mounted within a pattern groove on the base roll, again modified to incorporate the handle structures as described herein. The pattern roll cooperates with the platen roll which may have a smooth or textured cylindrical surface. Thermoplastic material exiting an adjacent die nozzle flows laterally of the rolls under the compressive forces of the pattern and platen rolls at the nip formed between the rolls. A sheet of material incorporating the chairmat pattern along with adjacent waste material is then passed about an idler roll to a cutter assembly as described in more detail in the '741 patent.

Accordingly, in its broader aspects the present invention relates to a desk chairmat comprising a semi-rigid substantially planar member, the chairmat having four side edges with a lip portion extending from one of the side edges, an upper side of the chairmat having a substantially smooth surface and a lower side of the chairmat having a plurality of spikes projecting therefrom; and, at least one handle attached to the chairmat along one of the side edges.

In another aspect, the invention relates to a process for forming a chairmat having an integral and/or separable handle and a continuous perimeter edge, comprising the steps of:

a) providing a pattern roll having a continuous pattern rib thereon defining a periphery of the chairmat including at least one handle;

b) rotating the pattern roll in opposition to a platen roll so that the pattern roll and the platen roll establish a volumetric portion at a nip region therebetween; and c) continuously extruding a molten thermoplastic material into the nip formed between the pattern roll and the platen roll while simultaneously rotating the pattern roll in opposition to the platen roll, the continuous simultaneous extrusion and rotation causing the molten thermoplastic material to fill completely the volumetric portion such that a chairmat preform exits the pattern and platen rolls having a continuous perimeter edge and at least one integral and separable handle formed therein.

Additional objects and advantages of the subject invention will become apparent from the detailed description which follows.

BRIEF DESCRIPTION OF THE DRAWINGS

FIG. 1 is a perspective view of a chairmat in accordance with a first exemplary embodiment of the invention;

FIG. 3 is an enlarged detail illustrating how two handles can be temporarily joined together in accordance with an alternative embodiment of the invention;

FIG. 11 is a side elevational view of a preferred pattern roll in accordance with the invention;

FIG. 12 is view showing the exterior of the pattern roll of FIG. 7 projected onto a planar surface for ease of understanding.

BEST MODE FOR CARRYING OUT THE INVENTION

Figure 2:
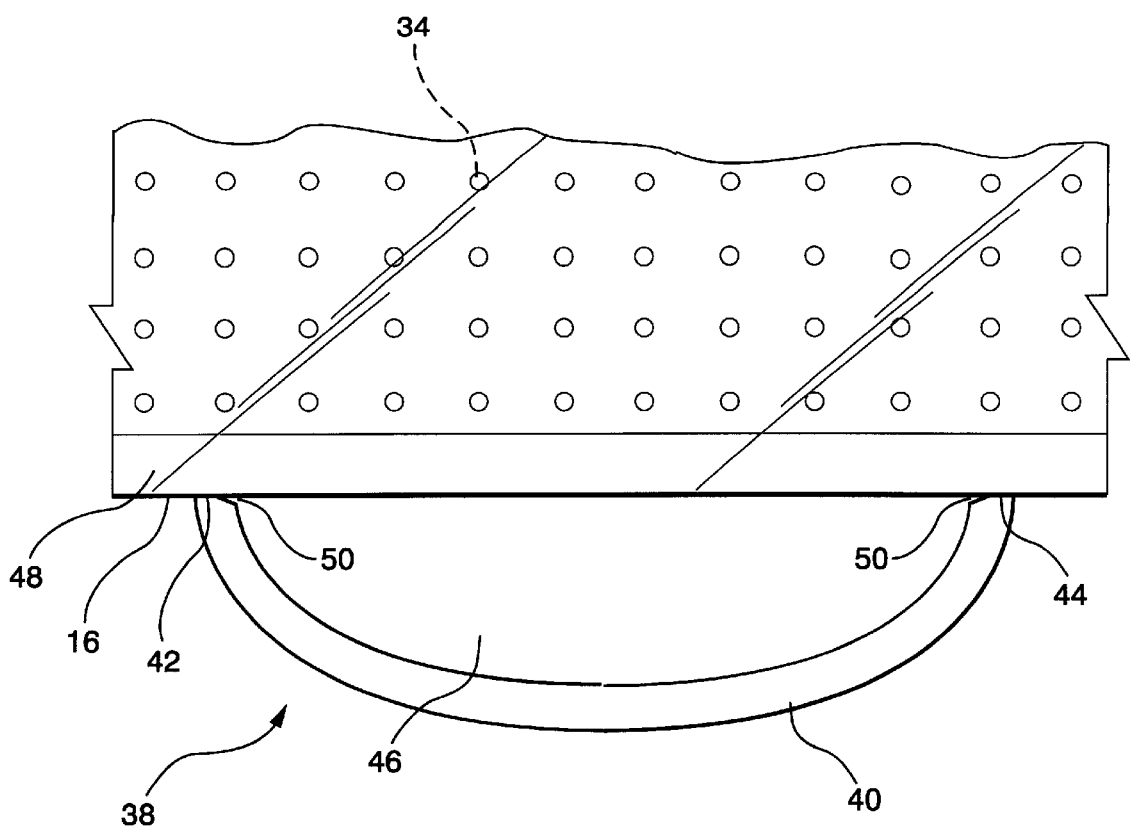
FIG. 2 is an enlarged detail of the chairmat shown in FIG. 1.
Figure 2A:
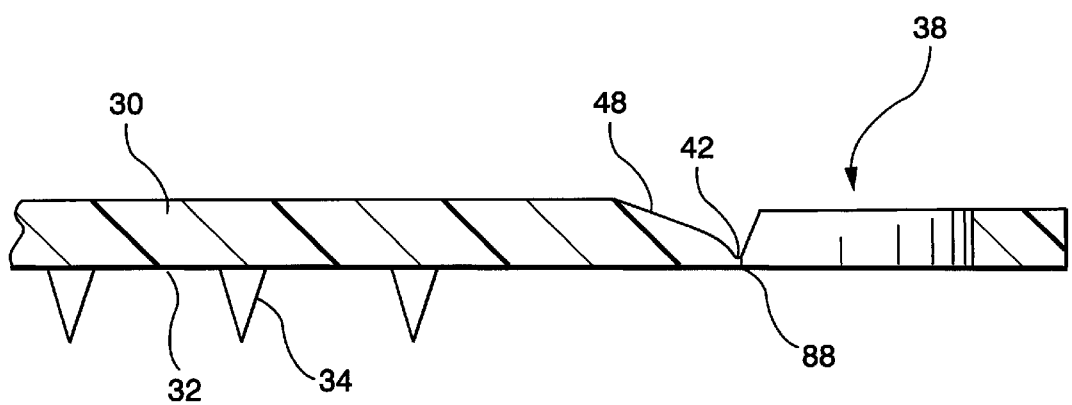
FIG. 2A is a partial cross section through the interface of the handle and chairmat shown in FIG. 2.

With reference to FIG. 1, a desk chairmat 10 includes a planar, semi-rigid member (made from, e.g., PVC, polypropylene, semi-rigid vinyl or other suitable material) having four side edges 12, 14, 16 and 18, which define a major portion 20 of the chairmat. An optional lip extension portion 22 of the same material and thickness, projects or extends integrally from side edge 12, and is further defined by edges 24, 26, 28. The lip extension 22, as is well known, is designed to project into the well area of a desk, with the remainder of the chairmat behind the desk and serving as the principal contact area for a desk chair (not shown) typically fitted with rollers or casters. The chairmat for purposes of this invention, however, need not have a lip extension of this type. The upper surface 30 of the chairmat is generally smooth, while the lower surface 32 is formed with a substantial number of relatively short but relatively sharp spikes 34 which are used to anchor the chairmat to an underlying carpet. As is well understood in the art, chairmats for use on hard flooring do not require such spikes. Note that spikes are not shown in all of the various mats illustrated in the Figures, and while the invention here is particularly beneficial in those instances where spikes are present, it is, of course, applicable to mats without spikes as well.

In accordance with an exemplary embodiment of this invention, the chairmat 10 is formed with a pair of integral handles 36, 38 which project from opposite side edges 12 and 16, i.e., the handles lie outside the periphery of the chairmat. While the location of the handles can vary, placing them along the longer sides of the chairmat is preferred since it requires minimal folding/rolling (as described below) and because, as folded, it produces a substantially cylindrical package of less height which is easier to carry. It is also advantageous to locate the handles in alignment with the center of mass of the chairmat so that the latter is balanced when gripped by the aligned handles. Since the handles 36, 38 are identical, only one need be described in detail.

With further reference to FIG. 2, handle 38 comprises a loop 40 connected at opposite ends thereof to the edge 16 along a pair of thinned webs or living hinges 42, 44, each of which having a length of about ⅜", but this dimension may vary. The loop 40 is arranged to form a handle opening 46. Note also that in the presently described embodiment, the chairmat is formed with an otherwise known ramp or tapered marginal edge 48 which extends about the entire periphery of the chairmat. Thus, where the handle loop 40 is joined to the edge 16 along the pair of thinned webs 42, 44, the thickness is only about 0.020", whereas the handle loop thickness may be the same as (but is preferably less than) the maximum thickness of the chairmat. This arrangement results in a handle which is strong in the lifting direction but relatively weak in shear, allowing the handle 38 to be torn from the edge 16 when no longer needed. For those chairmats which have square, non-tapered marginal edges, the thinned webs can still be employed and are formed as part of the manufacturing process as described further below.

To further enhance the tear-off feature, one or more notches 50 may be cut directly adjacent one or both of the thinned webs 42, 44. These notches help initiate the tearing action which, once started, is easily continued until the handle is completely removed from the chairmat. In this regard, one or two notches 50 may extend partially along each thinned web 42, 44. It is, of course, also possible to simply cut the handles along the thinned webs by means of a knife or scissors.

As explained above, it is preferred that handles 36, 38 be brought together to form a single handle. An optional feature of the invention relates to the ability to temporarily lock the handles 36, 38 together. In one such arrangement, shown in FIG. 3, the handle loop is modified somewhat to have a portion 52 which extends substantially parallel to an adjacent edge of the chairmat (best seen in FIG. 3A). Parallel portion 52 is provided with prongs 56, while the corresponding portion 54 of opposite handle loop is provided with mating apertures or openings 58, enabling the two handles to be friction fit together, while at the same time, remaining easily separable.

Figure 3A:
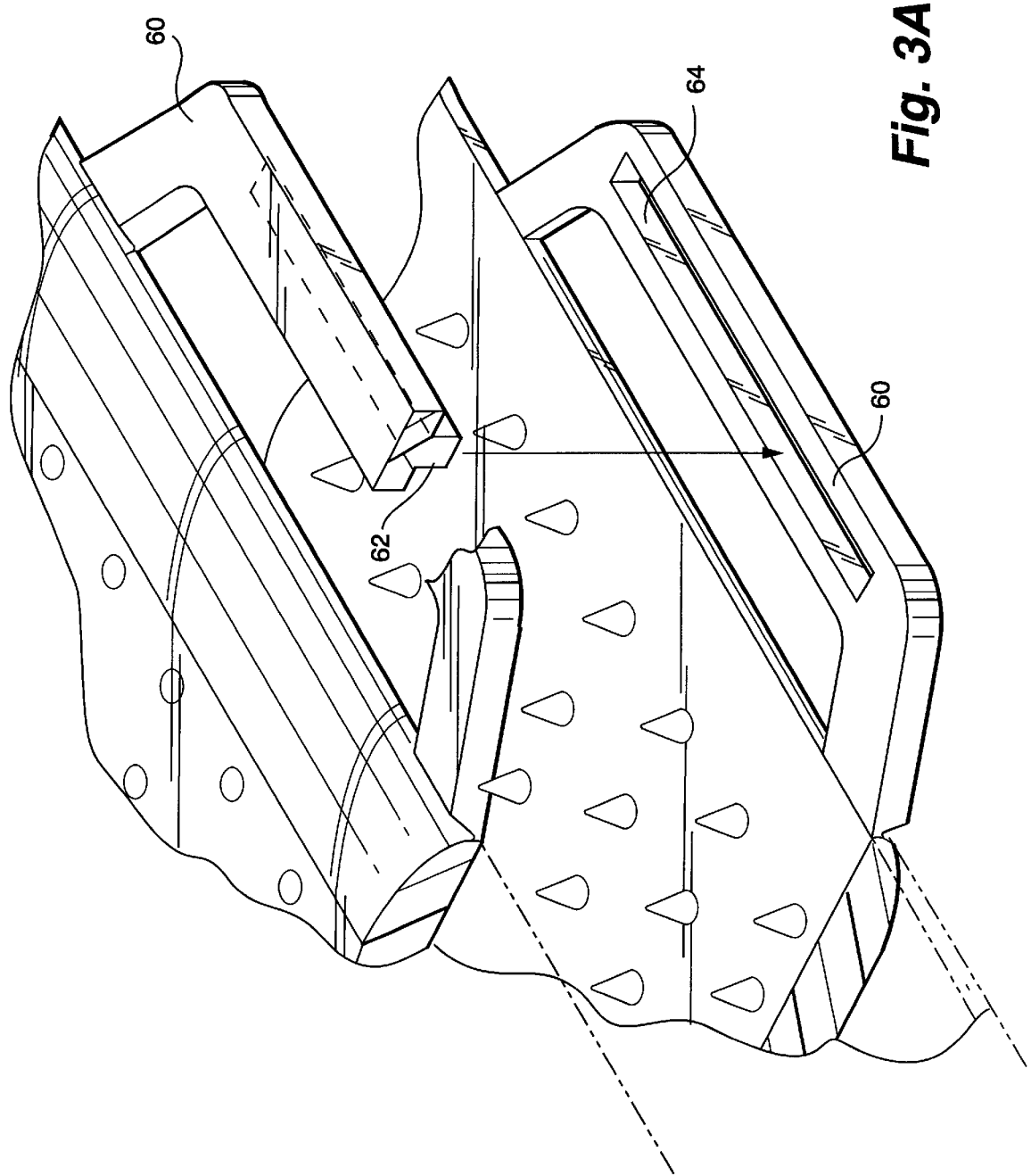
FIG. 3A is a partial perspective view illustrating the manner in which the handles can be temporarily interconnected in still another embodiment of the invention.

In another arrangement shown in FIG. 3A, handle portion 60 may be formed with an elongated projecting bar 62, while handle portion 60' may be formed with an elongated groove or recess 64, permitting temporary friction fit of the bar 62 within the groove or recess 64. The mating surface configurations are preferably located only on the portion of the handle which extends parallel to the adjacent chairmat edge. It will be appreciated that other mating surface configurations may be employed, however. including conventional snap-fit arrangements. The ability of the handle loops to come together in an essentially parallel orientation is due in large part to the presence of the thinned webs which join the handles to the chairmat, and which permit easy flexing of the handles.

Figure 4A:
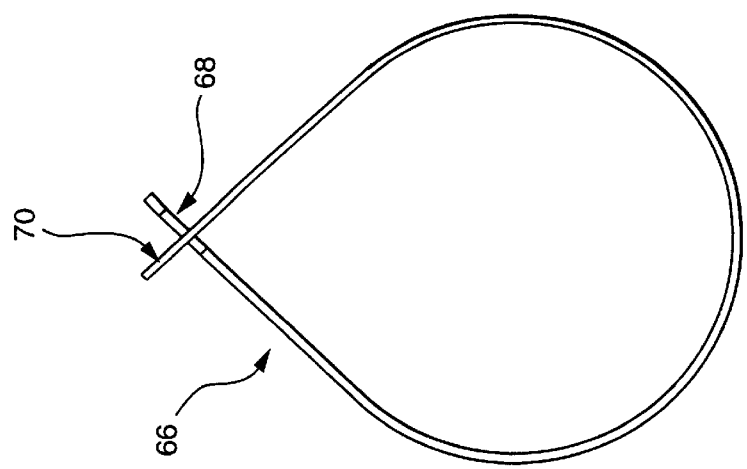
FIG. 4A is a partial end view of the chairmat shown in FIG. 4, with the mat partially folded and handle portions interengaged.
Figure 4:
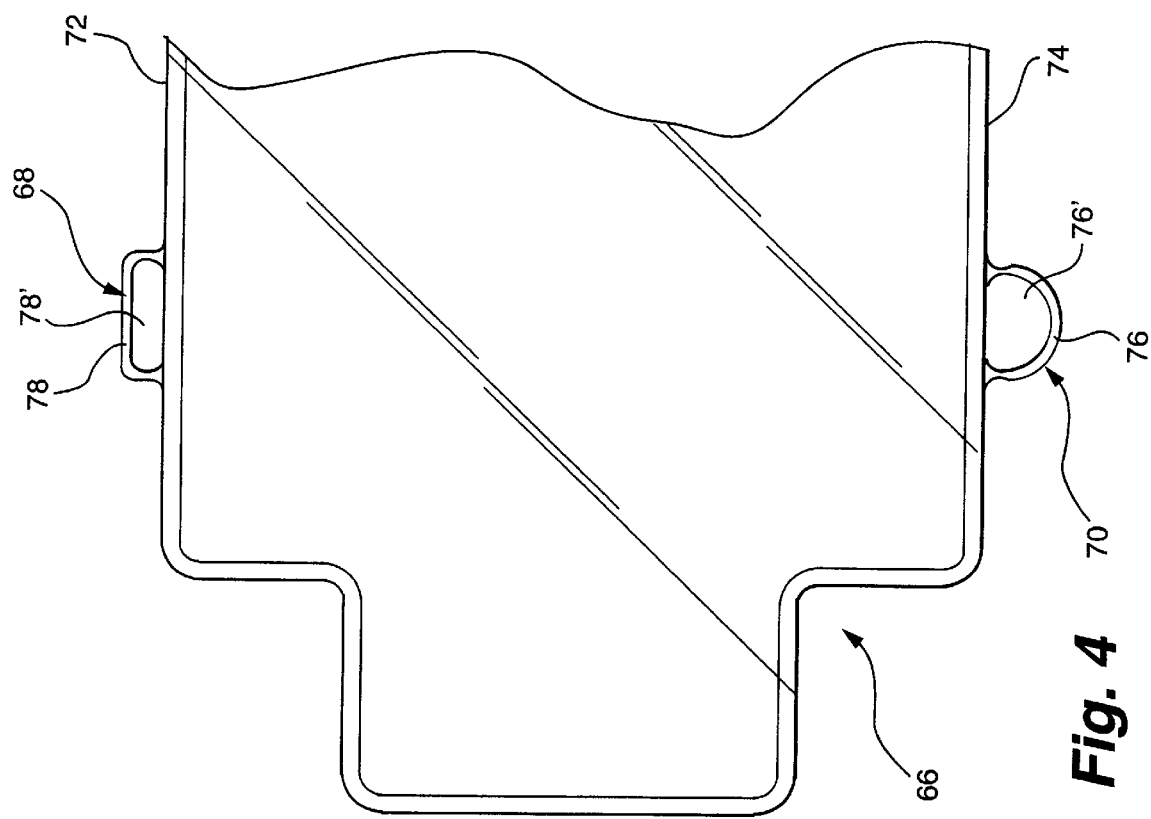
FIG. 4 is a partial plan view of a chairmat in accordance with another exemplary embodiment of the invention.
Figure 5:
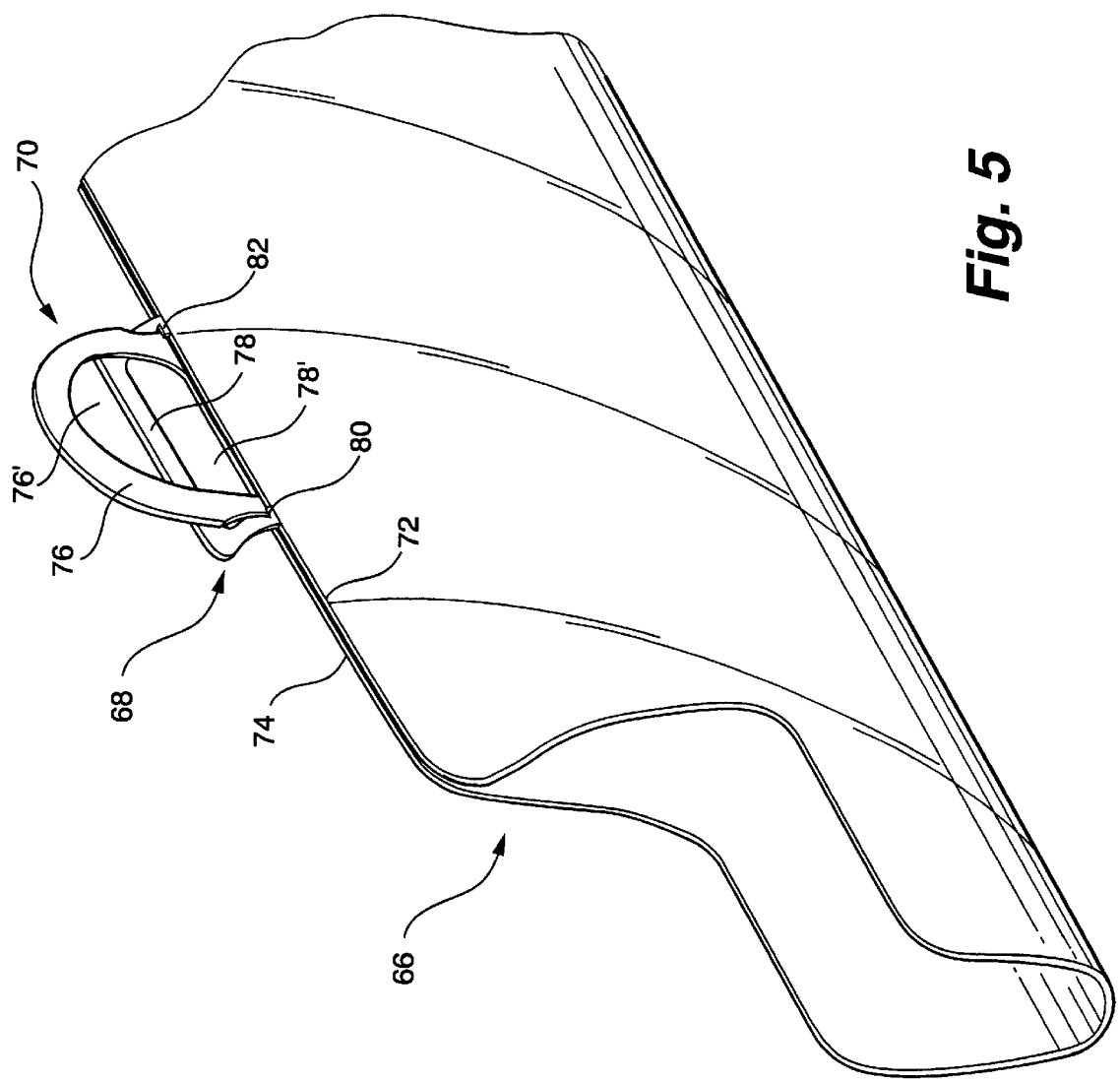
FIG. 5 is a partial perspective view of the chairmat shown in FIGS. 4 and 4A, with the handle portions interengaged.

In an alternative arrangement illustrated in FIGS. 4–5, the chairmat 66 includes integral handles 68, 70 along opposite side edges 72, 74. The loop 76 of handle 70 is made to have a larger opening 76' than the opening 78' of the opposite loop 78 of handle 68, but smaller in width, thus permitting the loop 76 to pass through the loop 78 (as shown in FIGS. 4A and 5) with the carrier of the chairmat gripping just the handle 70. With this arrangement, notches 80, 82 in the thinned web areas of loop 78 serve to temporarily lock the loop 76 within the loop 78 (see FIG. 5).

Figure 6:
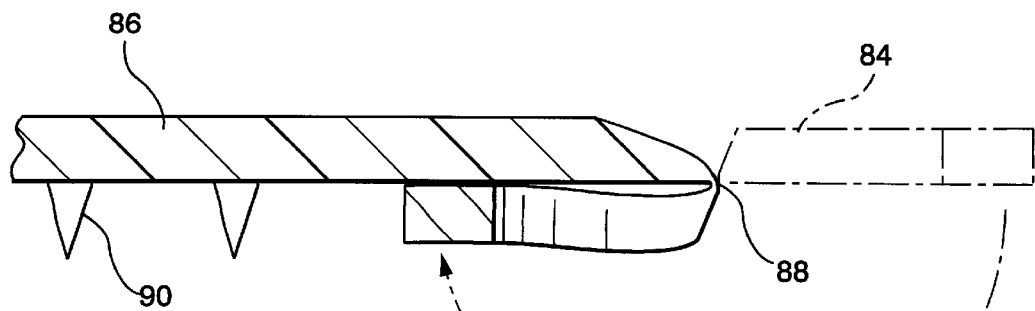
FIG. 6 is a partial section illustrating a handle configuration in accordance with still another embodiment of the invention.
Figure 7:
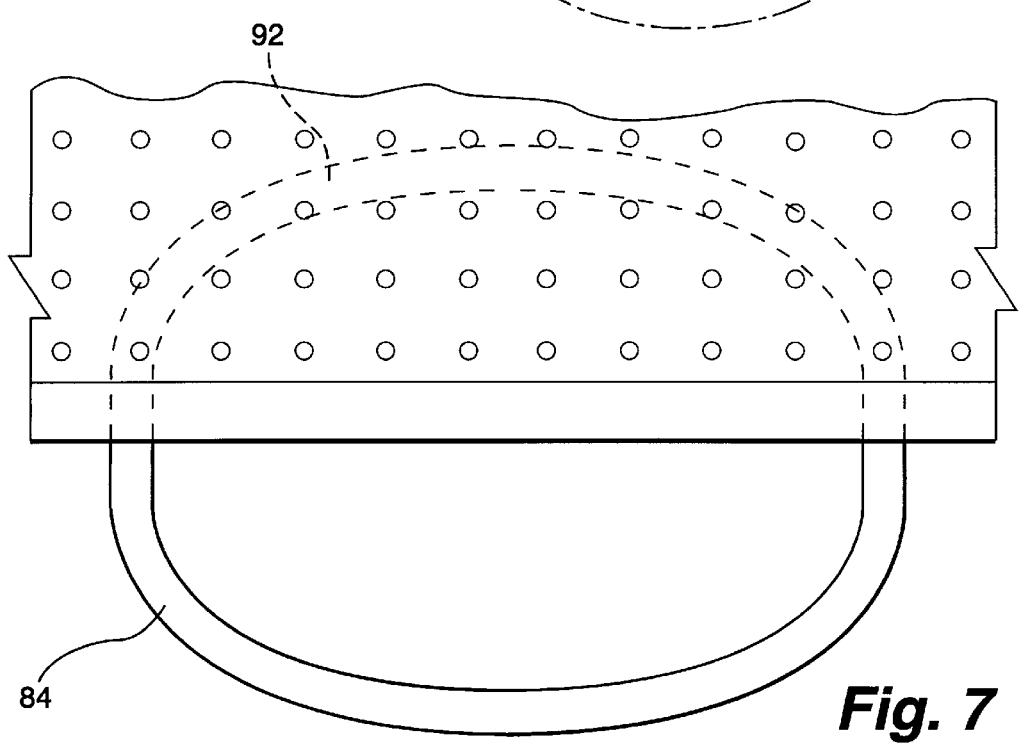
FIG. 7 is a partial plan view illustrating a variation of the embodiment shown in FIG. 6.
Figure 8:
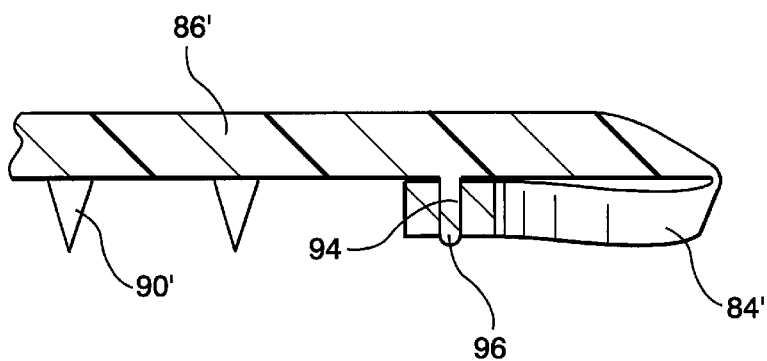
FIG. 8 is a partial section view illustrating yet another variation of the embodiment shown in FIG. 6.

With reference now to FIGS. 6 and 8, in a variation of the embodiment shown in FIG. 1, the interface between the handle 84 and the chairmat 86 includes a thin web or living hinge 88 similar to that described above, which enables the handle to be folded back underneath the chairmat when not in use. Because the thickness of the handle 84 is less than the height of the spikes 90, the handle will not interfere with the flat or planar orientation of the mat. In this regard, the handle may also have a thickness less than the chairmat itself to even further reduce the profile of the handle when folded under the mat. In a variation of this design, a shallow recess 92 may be formed in the underside of the mat (shown in phantom in FIG. 7) to at least partially receive the handle in the folded position. In still another variation of this embodiment, a hole 94 may be formed within the handle 84' which is adapted to snap fit over a spike-like protrusion 96 on the underside which may or may not have an enlarged head. Depending on the carpet spike pattern, the handle may have one or more apertures in which the spike or spikes are received.

Figure 9:
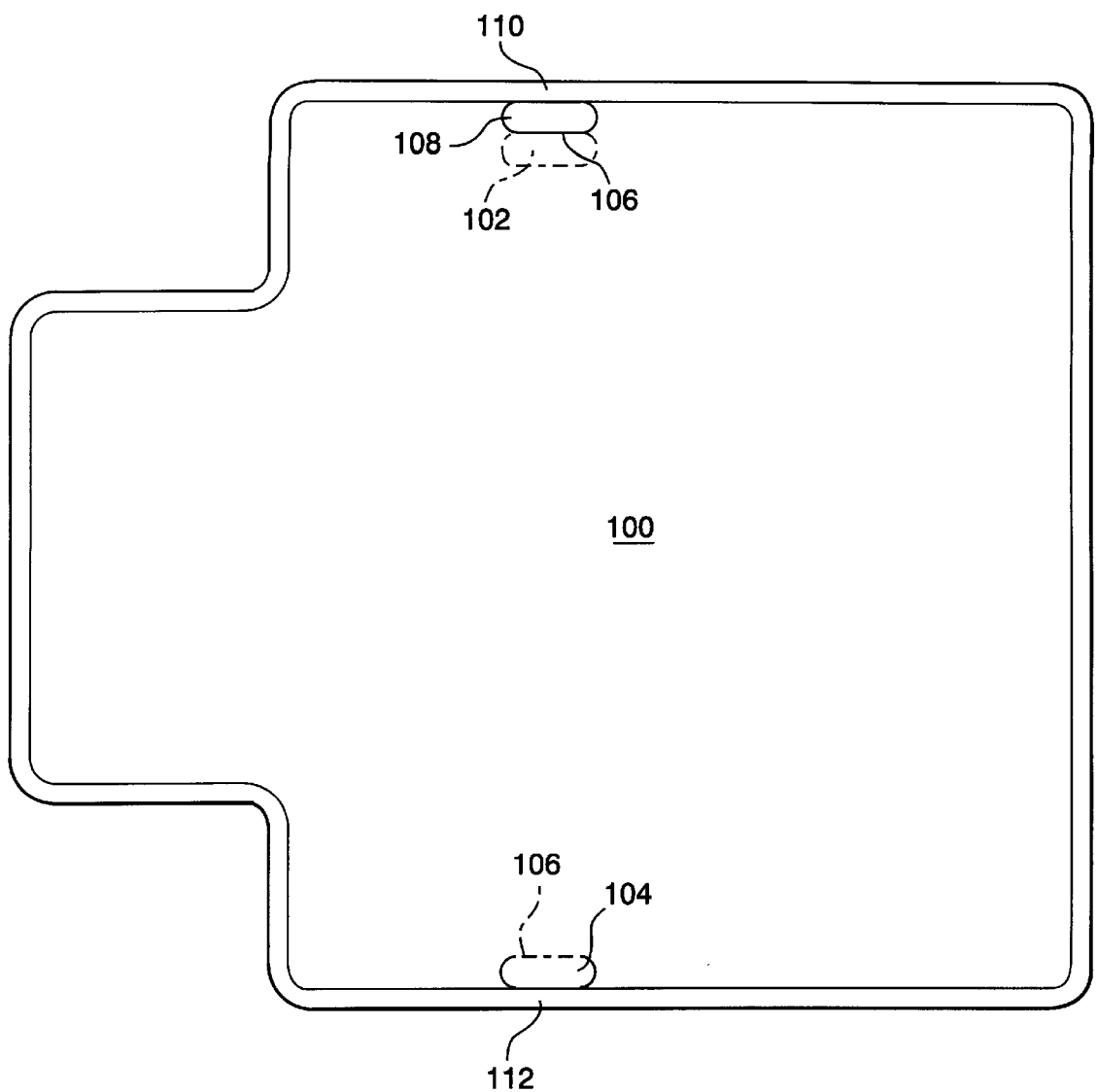
FIG. 9 is a plan view of a chairmat in accordance with another embodiment of the invention.

Turning now to FIG. 9, still another embodiment of the invention is shown where the handles are formed within the periphery of the chairmat 100. Specifically, handle openings are formed by die cutting handle panels 102 and 104 on three sides, leaving a fourth, connected side or edge 106 to serve as an integral hinge. In this way, the panels may be pushed out of the plane of the chairmat, thereby creating the handle openings (one shown at 108 with panel 102 pushed out of the plane of the mat and folded under the mat) with the remaining marginal chairmat portions 110 and 112 serving as the handle grips. As in the previously described embodiments, the opposed handles can be brought together for use as a single handle. When no longer required, the panels can be returned to a "closed" or "inoperative" position, within the plane of the chairmat, and thus causing no impediment to the free rolling of the desk chair casters on the chairmat.

With these arrangements, the handle may be retained without the problems which might otherwise be experienced by exposed handles. Moreover, by having the handles made movable from operative to inoperative positions, the user is able to reuse the handles when the mat is relocated or otherwise moved from its original position.

Figure 10:
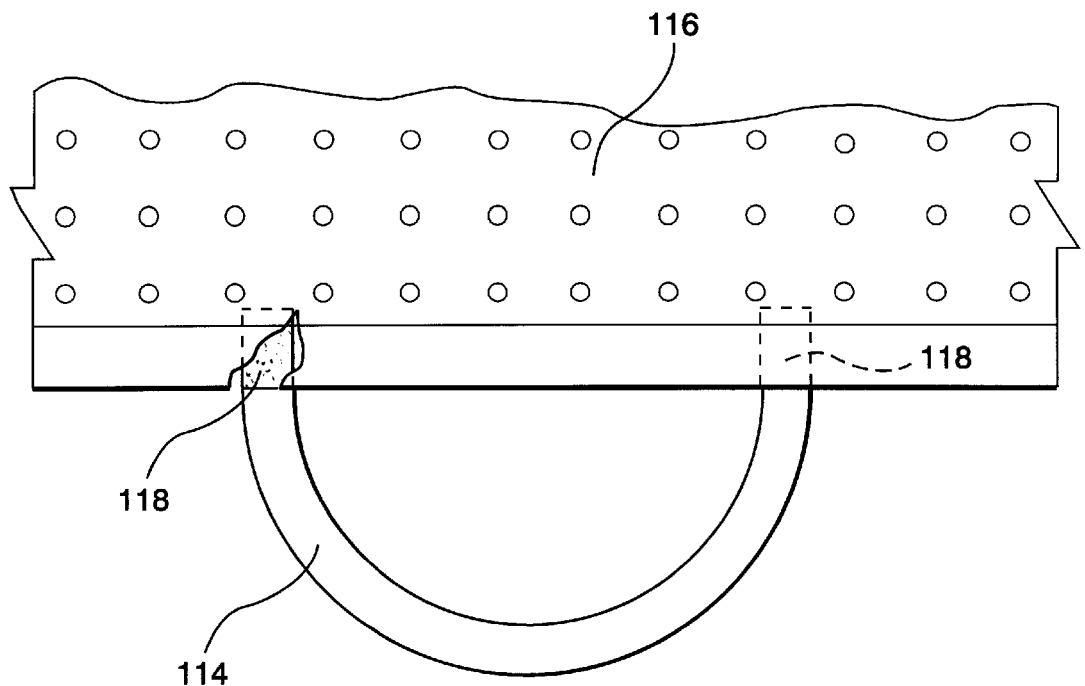
FIG. 10 is a partial plan view of a chairmat having a temporarily adhered handle in accordance with another embodiment of the invention.

In still another embodiment shown in FIG. 10, separable handles (one shown at 114 in FIG. 10) may be temporarily adhered to the chairmat 116. Any suitable non-permanent commercial adhesive 118 may be used. The significant factor is the ability to hold the handles and chairmat together for lifting purposes, but to also allow the handles to be peeled or pulled off the chairmat when no longer needed.

Figure 10A:
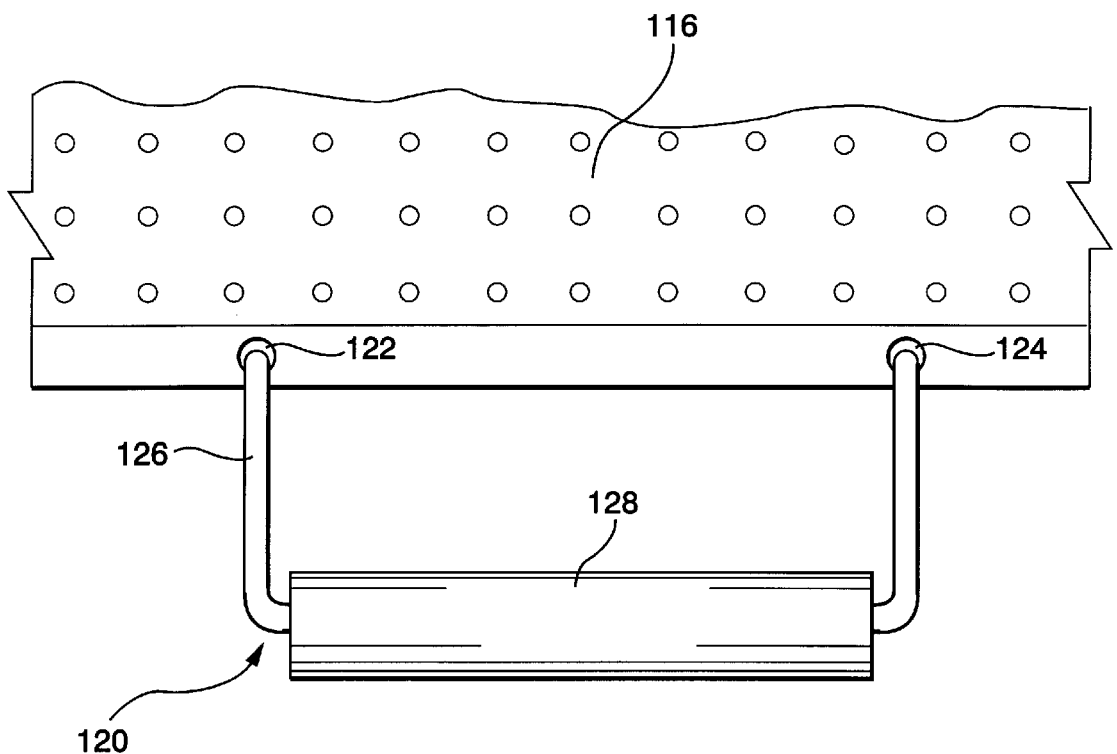
FIG. 10A is a partial plan view of a chairmat having a string handle in accordance with another embodiment of the invention.

In still another embodiment shown in FIG. 10A, a removable string handle 120 may be threaded through a pair of small holes 122, 124, respectively, at opposite sides of the chairmat. These handles including the string 126 and a wood or plastic grip 128 can be cut away and removed when no longer needed, and the small holes will remain but because of their small diameter, will not interfere with the rolling action of the desk chair casters. Of course, the number and location of holes and the specific configuration of the handle itself may vary as desired.

Figure 13:
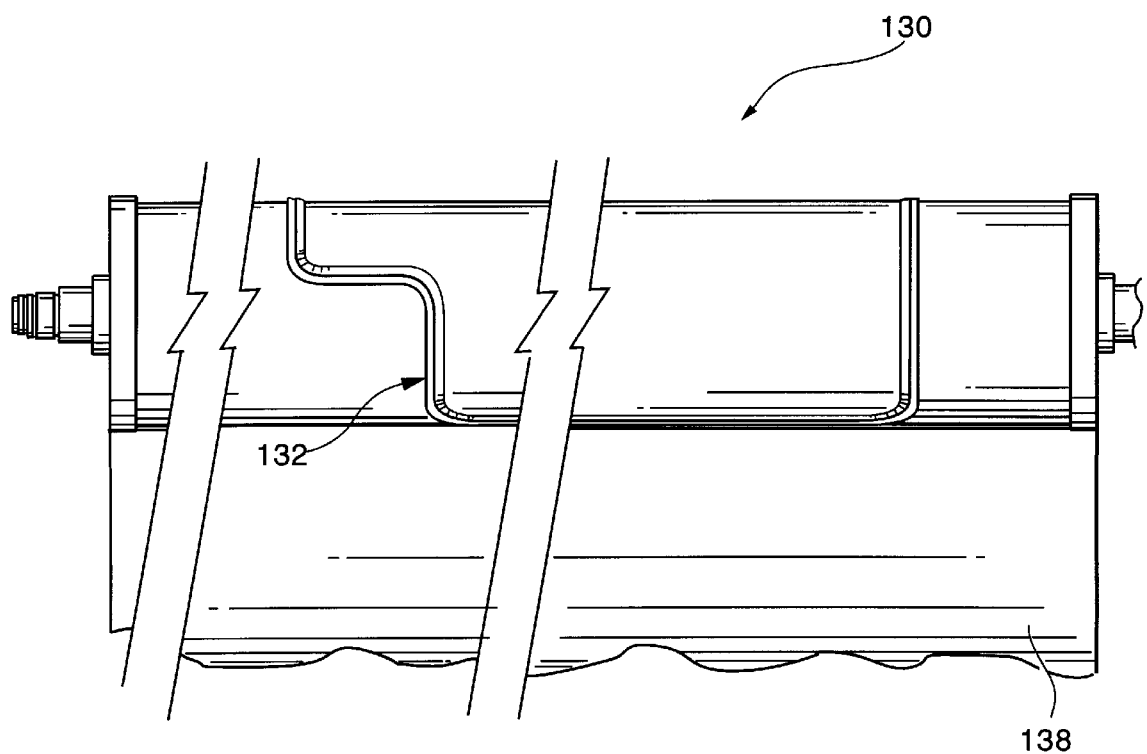
FIG. 13 is a side elevational view showing the operative cooperation between the pattern roll and an adjacent platen roll.

The above described chairmat constructions (the chairmats of FIGS. 10 and 10A will be made without integral handles) can be made in accordance with various known plastic forming techniques including stamping of preformed sheets. The preferred technique, however, is as described in commonly owned U.S. Pat. No. 5,213,741, incorporated herein by reference. Briefly, and with reference to FIGS. 11, 12 and 13, a pattern roll 130 is formed to include a substantially continuous pattern rib 132 which defines the peripheral boundary of the chairmat and which also include in accordance with a preferred embodiment of this invention, a pair of integral handle forming ribs 134, 136. FIG. 12 shows the pattern projected onto a planar surface for ease of understanding. When the pattern roll 130 is paired with a platen roll 138, as shown in FIG. 13, it will be appreciated that thermoplastic material fed into the nip region between the roll pair and will fill the volumetric region within the continuous rib and integral handles, with additional waste material lying outside the pattern rib. The chairmat exits the nip as a mat preform and passes around an idler roll which may be supplied with a cooling medium so as to solidify the sheet. The sheet then passes on to a further downstream processing station including a cutter assembly which removes the waste material lying outside the periphery of the chairmat, and the waste within the handle openings.

The cutter assembly may include, as described in the '741 patent, a cutter roll and a pressure roll preferably coated with an elastomeric layer. The cutter roll has a cutting edge corresponding in shape and outline to the chairmat with handles, and is rotated in synchronism with the sequential passage of the mat preforms so that the cutting edges on the cutter roll register exactly with the peripheral and handle edges of the mat preforms. It will be noted that the pattern roll and the pattern rib incorporated into the roll, including the handle forming pattern ribs, are so configured as to provide the thin web regions or living hinges (and notches if used), described hereinabove, which permit the integral handles to be removed from the chairmat, or folded under the chairmat, depending on the specific application.

Note that while the various handle configurations have been shown in pairs, single handles may be used as well. In addition, the one or two handles can be provided along any of the side edges of the chairmat. Moreover, the shape of the handle, i.e., arcuate, rectangular, etc. may also be varied as desired. It will also be appreciated that the handles may be used in conjunction with a folding mat as disclosed in U.S. Pat. Nos. 5,073,428 and 4,784,888. Note, for example, the phantom fold line A in FIG. 1. While not always desirable, a fold line will facilitate the bringing together of the handles, and reduce the profile of the chairmat during handling.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A desk chairmat comprising a semi-rigid substantially planar member, said member having four side edges with a lip portion extending from one of said side edges; an upper side of the chairmat having a substantially smooth surface and a lower side of the chairmat having a plurality of spikes projecting therefrom; and at least one handle attached to said chairmat along one of said side edges; and wherein said at least one handle is temporarily adhered to said chairmat.

2. A desk chairmat comprising a semi-rigid substantially planar member, said member having four side edges with a lip portion extending from one of said side edges; an upper side of the chairmat having a substantially smooth surface and a lower side of the chairmat having a plurality of spikes projecting therefrom; and a pair of handles connected to said chairmat along two of said four side edges, respectively, by thinned webs to thereby enable said pair of handles to be removed from said chairmat along said thinned webs.

3. The chairmat of claim 2 wherein said planar member is sufficiently flexible to permit partial folding; and wherein said pair of handles have complementary attachment means for enabling temporary joining together of said pair of handles.

4. The chairmat of claim 2 wherein said material comprises polyvinylchloride.

5. The chairmat of claim 2 wherein said material comprises polypropylene.

6. The chairmat of claim 2 including at least one notch adjacent one of said thinned webs.

7. The chairmat of claim 2 wherein each of said pair of handles has a thickness greater than said thinned webs, but less than said planar member.

8. A desk chairmat comprising a semi-rigid substantially planar member, said member having four side edges with a lip portion extending from one of said side edges; an upper side of the chairmat having a substantially smooth surface and a lower side of the chairmat having a plurality of spikes projecting therefrom; and at least one handle attached to said chairmat along one of said side edges; and including a second handle, said at least one and said second handles including means for enabling detachment of said handles from said chairmat.

9. The chairmat of claim 8 wherein said one and said second handles each comprises a string handle secured to said planar member by means of a pair of holes formed along said second and third of said four side edges.

10. The chairmat of claim 8 wherein said material comprises polyvinylchloride.

11. The chairmat of claim 8 wherein said material comprises polypropylene.

12. A desk chairmat comprising a semi-rigid substantially planar member, said member having four side edges with a lip portion extending from one of said side edges; an upper side of the chairmat having a substantially smooth surface and a lower side of the chairmat having a plurality of spikes projecting therefrom; and at least one handle attached to said chairmat along one of said side edges; and including a second handle and wherein said at last one handle is smaller in width than said second handle so as to enable said one handle to pass through said second handle.

13. A desk chairmat comprising a semi-rigid substantially planar member, said member having four side edges with a lip portion extending from one of said side edges; an upper side of the chairmat having a substantially smooth surface and a lower side of the chairmat having a plurality of spikes projecting therefrom; and at least one handle attached to said chairmat along one of said side edges; and including a second handle and means for locking said at least one handle and said second handle.

14. A chairmat for comprising a semi-rigid planar member having four side edges, an upper side of the planar member having a substantially smooth surface; at least one handle integrally secured along a side edge of said planar member, said at least one handle connected to said side edge by thinned webs which enable said handle to be moved between operative and inoperative positions.

15. The chairmat of claim 14 wherein the lower surface of said planar member is formed with at least one recess adapted to receive said at least one handle when folded to the inoperative position.

16. The chairmat of claim 14 wherein said at least one handle and lower surface of the chairmat are provided with interlocking elements for releasably holding said at least one handle in the inoperative position.

17. The chairmat of claim 14 and further comprising a plurality of spikes extending from a lower surface thereof.

18. The chairmat of claim 17 wherein said spikes have lengths greater than a thickness dimension of said at least one handle.

19. The chairmat of claim 18 wherein said thickness dimension is less than a corresponding thickness dimension of said planar member.

* * * * *